United States Patent [19]

Dapo

[11] Patent Number: 4,860,169
[45] Date of Patent: Aug. 22, 1989

[54] LONG CHAIN CARBOXYLIC ACIDS FOR VERY HIGH VOLTAGE ALUMINUM ELECTROLYTIC CAPACITORS

[75] Inventor: Roland F. Dapo, Columbia, S.C.

[73] Assignee: North American Philips Corporation, New York, N.Y.

[21] Appl. No.: 284,206

[22] Filed: Dec. 14, 1988

[51] Int. Cl.⁴ .............................................. H01G 9/02
[52] U.S. Cl. ..................................... 361/506; 252/62.2
[58] Field of Search ................. 252/62.2; 361/505, 506

[56] References Cited

U.S. PATENT DOCUMENTS

| | | | |
|---|---|---|---|
| 3,931,552 | 1/1976 | Anderson et al. | 252/62.2 X |
| 4,469,610 | 9/1984 | Fukuda et al. | 361/505 X |
| 4,715,976 | 12/1987 | Mori et al. | 252/62.2 |
| 4,734,821 | 3/1988 | Morimoto et al. | 252/62.2 X |

*Primary Examiner*—Donald A. Griffin
*Attorney, Agent, or Firm*—Norman N. Spain

[57] ABSTRACT

An improved electrolytic capacitor is particularly useful for operation at voltages above 500 volts is produced by employing an electrolyte containing a straight chain saturated aliphatic dicarboxylic acid in which the carboxylic moieties are separated by at least 14 carbon atoms.

14 Claims, 1 Drawing Sheet

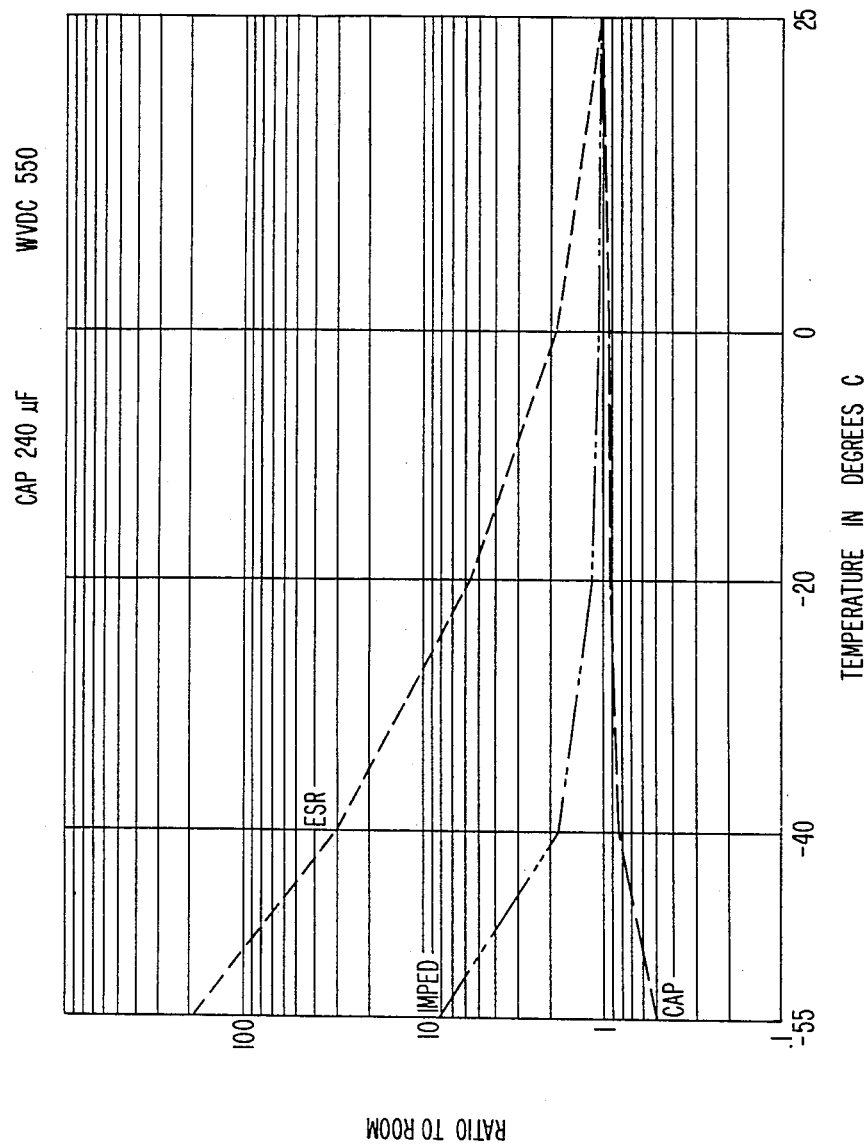

LONG CHAIN CARBOXYLIC ACIDS FOR VERY HIGH VOLTAGE ALUMINUM ELECTROLYTIC CAPACITORS

BACKGROUND OF THE INVENTION

The invention in the instant application relates to electrolytic capacitors and to improved electrolyte therefore.

In particular, the invention in the instant application relates to electrolytic capacitors having aluminum cathode and anode members which are suitable for use in high operating voltages, in particular voltages above 500 volts and electrolyte solutions for electrolytic capacitors to be used at such high voltages particularly voltages above 500 V.

These capacitors must be capable of maintaining the dielectric oxide film on the anode by forming new oxide at the applied voltage. Thus, if the forming voltage is 700 V no dielectric breakdown should occur at 550 V. In addition, it is necessary that the resistivity of the electrolyte solution should be as low as possible because this resistivity contributes to the (ESR) equivalent series resistance of the capacitor. Further the capacitor should be capable of operating over a wide temperature range.

Although attempts have been made to produce an electrolytic capacitor employing aluminum anode and cathode members capable of operating at a voltage of greater than 500 volts in a wide temperature range while exhibiting a low ESR such attempts have not provided to be successful.

Thus, Japanese Kokai 60,132,313 as abstracted in 103 Chem Abs 674 shows the use of an electrolyte comprising a solution of a salt of an amine with an organic carboxylic acid where the carboxylic acid is a polybasic side chain substituted acid of 16–22 carbons. The resulting capacitors have a voltage rating up to as high as 480 V and exhibit relatively low ESR values. However, there is no suggestion of producing capacitors with voltage ratings of above 500 volts.

Japanese Kokai 57-27013 shows electrolytes for electrolytic capacitors comprising solutions of dibasic acids having akyl side chains and 16–22 carbons dissolved in a solvent of which the main component is ethylene glycol. This electrolyte may include small amounts of ammonia and boric acid. As shown in the specification of this patent, capacitors having a voltage rating as high as 500 volts may be produced. However, here too there is no suggestion of producing electrolytic capacitors having a voltage rating greater than 500 volts.

European Patent Application 0227433 shows an electrolytic capacitor employing as an electrolyte fill an electrolyte solution comprising a quaternary ammonium salt of a branched chain aliphatic dicarboxylic acids having 11–30 carbon atoms dissolved in a polar organic solvent. Employing such electrolytes, this reference shows the production of capacitors voltage having ratings of up to 475 volts. However, there is no suggestion that by the use of the electrolytes disclosed therein, capacitors having voltage ratings above 500 volts and exhibiting low ESR values may be produced.

Additionally, it should be noted that while electrolytic capacitors having voltage ratings of 500 volts and slightly higher may be produced with use of conventional boric electrolytes, it is necessary in such cases to employ unusually thick paper pads in order to minimize the voltage across the dielectric aluminum oxide since the boric acid limits the maximum voltage across the oxide. As a result, a high resistance is introduced. This high resistance is a significant factor in producing a voltage drop across the capacitor and permits the manufacture and use of high voltage photoflash capacitors. These capacitors require a high leakage current at the rated voltage. Since photoflash capacitors are relatively small, any heat dissipated does not increase significantly the operating temperature of the capacitors, however such a situation is not tolerable in large computer capacitors rated at 500 volts or above. In such case, a high leakage current may lead to a thermal run away resulting in the destruction of the capacitor.

SUMMARY OF THE INVENTION

A principal object of this invention is to provide electrolytic capacitors comprising aluminum anode and cathode members which may be satisfactorily employed at voltages above 500 volts in a wide temperature range while exhibiting relatively low equivalent series resistances at the operating voltages.

According to the invention there are produced electrolytic capacitors which comprise aluminum anode and cathode members separated by insulating spacers impregnated with an electrolyte consisting essentially of a solution of a straight chain saturated aliphatic dicarboxylic acid in which the carboxylics are separated by at least 14 carbon atoms in a mixture of at least one polar organic solvent and at least water in an amount of from 4–30% by weight of the organic solvent or a borate in an amount of 2–5% by weight of the organic solvent. It has been found that the novel capacitors of the invention exhibit voltage ratings of above 500 volts together with low equivalent series resistances and are capable of operating over a temperature range from −40° C. to 105° C.

BRIEF DESCRIPTION OF THE DRAWING

The sole FIGURE in the drawing is a graph showing the variation of properties of a representative electrolytic capacitor of the invention with temperature

DETAILED DESCRIPTION OF THE INVENTION

While any suitable polar organic solvent or mixture of polar organic solvents may be employed, it has been found that very satisfactory results may be achieved by use of a mixture of polar organic solvents which consists of at least one of the solvents of the group of ethylene glycol, dimethylacetamide, dimethylformamide, and butyolactone and at least one solvent selected from the group consisting of tetrahydrofurfuryl alcohol, dimethylsulfoxide, N-methylacetamide, and N-methyl formamide.

For complete solubility of the dicarboxylic acid it is necessary that a sufficient ammonia or an amine be added to the solution to render it basic more particularly to a pH value of 6.0–10.0 and preferably from 7.0–10.0.

Preferably the pH of the electrolyte solution is adjusted by the addition of ammonia or an amine selected from the group consisting of ammonia, dimethylamine, dimethylamine, and piperidine.

While the polar organic solvents as recited may be readily be employed in the electrolyte solution of the invention to produce good results, it has been found that particularly good results are achieved by use of a mixture of polar organic solvents consisting of a major amount of ethylene glycol, a minor amount of tetrahydrofurfuryl alcohol and a minor amount of dimethylacetamide. This is especially so when the dicarboxylic acid employed is a saturated straight chain acid having a molecular weight of about 565 where the carboxylic acid groups are separated by 34 —CH$_2$ (methylene) groups. This acid is hereinafter termed "Dicarboxylic Acid".

However other straight chain saturated aliphatic dicarboxylic acids the carboxylics of which are separated by at least 14 carbons such as thapsic, or docosanedioic acids may also employed.

The borate is preferably employed in the form of boric acid.

When water is present up to 5% by weight of the borate may be present to present corrosion.

In some cases it is found that the addition of phosphoric acid in the amount of up to 10% by weight provides improved results.

Particularly improved results have been found by use of an electrolyte consisting essentially of a solution of about 2-5% of weight of the dicarboxylic acid.

The following are electrolyte compositions that have proved to be particularly useful in the capacitors of the invention.

A. A solution of about 3-5% by weight of dicarboxylic acid in a mixture, by weight, of about 65-70% ethyline glycol, 7-10% tetrahydrofurfuryl alcohol, 10-16% dimethylacetamide, 4-8% water and 0.6-1.0% dimethylamine.

B. A solution of about 2-4% by weight of dicarboxylic acid in a mixture, by weight, of about 80-90% ethyline glycol, 8-10% tetrahydrofurfuryl alcohol, 4-10% water and 0.20-0.75% ammonia.

The invention will now be described in greater detail with reference to the following examples:

|  | 609D | 749T | 749U |
|---|---|---|---|
| Ethylene Glycol | 86.125 w/o | 79.25 w/o | 79.25 w/o |
| Tetrahydrofurfuryl Alcohol | 9.000 | 9.00 | 9.00 |
| Water | 2.000 | 6.00 | 6.00 |
| Dicarboxylic Acid | 2.375 | 4.75 | 4.75 |
| 28% Aqueous Ammonia | 0.500 | 1.00 | 1.00 |
| 85% Phosphoric Acid | 0.000 | 0.00 | 0.025 |
| heat to: | 65C | none | none |
| Resistivity, 30C, ohm.cm | 3330 | 1395 | 1395 |
| Scintillation Voltage, 85° C. | 680 | 570 | 540 |

Capacitor sections were made using 700EFV aluminum anode foil, aluminum cathode foil and paper separators. The three compositions listed above were evaluated in regard to the aging or "burn in" of capacitor sections treated with them. The aging procedure involved applying 4 ma per unit in a constant current mode, the maximum voltage applied to these capacitors was 570 using a 70° C. oven.

The capacitors containing the 609D composition required over 6.5 hours to reach the age voltage of 570. These capacitors were allowed to remain at this voltage for about 16 hours in an 85° C. oven. The unit were allowed to cool and the leakage current, capacitance and ESR were determined. The leakage current behavior was found to be unsatisfactory. The leakage current was at first satisfactory, in that it was within the limit required by the design. However, on standing at room temperature for several days or at elevated temperatures for a few hours, the leakage current increased to unsatisfactory levels.

The two compositions 749T and 749U behaved in a much better manner. The capacitors made with these fill electrolytes reached age voltage of 570 in 2.70 hr. These were also burned in by leaving them in an oven at 85 C. with the 570 V applied for a period of 16 hr.

The initial electrical properties of the capacitors made from the compositions, 749T and 749u are shown in the following table:

|  | IL5ma | IL10ma | CAP(uF) | ESRohms |
|---|---|---|---|---|
| 749T | .432 | .323 | 239 | .4225 |
| 749U | .261 | .195 | 244 | .3003 |

IL 5 = leakage current after 5 minutes
IL 10 = leakage current after 10 minutes

From these results it was concluded that the water level in the composition was critical to the aging behavior of the fill electrolyte. The trace level of phosphate in the composition, 749U, likewise appears to show a positive benefit as compared to the 749T in that the leakage current values are much lower.

OPEN CUP SCINTILLATION AND AGE BEHAVIOR

Variations of the 749U formulations were investigated in regard to the open cup scintillation behavior and resistivities of the mixtures. The compositions were as follows:

|  | 749U | 749V | 749X |
|---|---|---|---|
| ETHYLENE GLYCOL | 79.25 w/o | 62.50 w/o | 74.50 w/o |
| TETRAHYDROFURFURYL ALCOHOL | 9.00 | 14.00 | 9.00 |
| WATER | 6.00 | 12.00 | 5.00 |
| DICARBOXYLIC ACID | 4.70 | 9.50 | 9.50 |
| 28% AQUEOUS AMMONIA | 1.00 | 2.00 | 2.00 |
| 85% PHOSPHORIC ACID | 0.05 | 0.05 | 0.05 |
| Resistivity, 30C, ohm.cm | 1347 | 577 | 767 |
| Scintillation Voltage | 540 | 490 | 520 |

These formulations were used in treating capacitor sections of the same design as was described above. The sections were assembled and aged in the same manner. The final voltage was 570. The initial properties of these capacitors were measured and the averages are as follows:

|  | IL5 ma | Cap(uF) | ESR ohms |
|---|---|---|---|
| 749U | .189 | 248 | .3048 |
| 749V | .162 | 249 | .1913 |
| 749X | .159 | 244 | .2260 |

The above capacitors were further aged in a 70° C. oven at 610 volts for 16 hours. Again, all units aged up to this voltage without any electrical shorts forming. Thus the ultimate use voltage of these compositions is greater than 610 V. The completed units were measured as a 600 V design. The average values for each of the fill electrolytes are tabulated below:

|  | IL5 ma | Cap(uF) | ESR ohms |
|---|---|---|---|
| 749U | .594 | 250 | .3231 |
| 749V | .507 | 249 | .2089 |

-continued

| | IL5 ma | Cap(uF) | ESR ohms |
|---|---|---|---|
| 749X | .579 | 243 | .2547 |

The following composition was also prepared:

| CHEMICAL | Composition B wt % |
|---|---|
| ETHLENE GLYCOL | 68.00 |
| TETRAHYDROFURFURYL ALCOHOL | 9.00 |
| DEMETHLACETAMIDE | 12.00 |
| DI WATER | 6.00 |
| DICARBOXYLIC ACID | 4.25 |
| DIMETHYLAMINE | 0.75 |

This mixture was heated to between 65° C. and 90° C. after the final addition of the amine. The initial properties measured for this composition are; (1) resistivity at 30° C., 1280 ohm·cm (2) pH=9.68 (3) Scintillation voltage 500.

There were no age losses up to and including a voltage of 610, for capacitors made by using the 700 formation voltage anode foil and composition B. It was thus concluded that the high water concentrations improve the age yields of the capacitors in spite of the fact that the higher levels of water cause a lower open cup scintillation voltage.

Samples of these capacitors were life tested with full rated voltage of 550 volts at 85° C. with the following results:

| TIME, hr at 85C | CAP uF | % of Initial Cap | ESR ohms | % of Initial ESR |
|---|---|---|---|---|
| 0 | 233 | 100.00 | 0.260 | 100.00 |
| 500 | 224 | 97.10 | 0.270 | 104.85 |
| 1000 | 223 | 95.38 | 0.300 | 117.54 |

The low temperature characteristics of a capacitor at 550 volts DC, employing the 749 V electrolyte and having a capacitance of 24 uF, an impedance (IMPED) at 120 Mz of 0.517 ohms and an equivalent series resistance (ESR) of 0.217 ohms at room temperature (25° C.) is shown in the sole FIGURE of the drawing.

As will be apparent from this FIGURE which is a graph in which the temperature is shown along the abscissa and (as a ratio to their values at room temperature) the impedance, equivalent series resistance and capacitance are shown along the ordinate this capacitor is useful even at a temperature as low as 40° C. Normal glycol fill electrolyte capacitors, operating at 450 volts, are useful only at much higher temperature, generally not less than about −20° C.

What is claimed:

1. An electrolytic capacitor particularly adapted for use above 500 volts comprising aluminum anode and cathode members separated by an insulating spacer impregnated with an electrolyte consisting essentially of a solution of a straight chain saturated aliphatic dicarboxylic acid, the carboxylic moieties which are separated by at least 14 carbons, in a mixture of at least one polar organic solvent and water in an amount of from 2-40% by weight of the by weight of the organic solvent and a sufficient amount of ammonia or an amine to render the solution basic.

2. The capacitor of claim 1 wherein the pH of the solution is 6.0–10.0.

3. The capacitor of claim 2 wherein the solution contains a borate in an amount from 0 to about 5% by weight of the organic solvent.

4. An electrolytic capacitor particularly adapted for use above 500 volts comprising aluminum anode and cathode members separated by an insulating spacer impregnated with an electrolyte consisting essentially of a solution of a straight chain saturated aliphatic dicarboxylic acid, the carboxylic moieties of which are separated by at least 14 carbons, in a mixture of polar organic solvents, said mixture of polar organic solvents being a mixture of at least one solvent selected from the group consisting of ethylene glycol, dimethylacetamide, dimethylformamide and butryolactone and at least one solvent selected from the group consisting of tetrahydrofurfuryl alcohol, dimethylsulfoxide, methylacetamide and N-methylformamide and water in an amount of from 4-30% by weight of the organic solvents and a sufficient amount of ammonia or an amine to render the solution basic.

5. The capacitor of claim 4 wherein the pH of the solution is about 7.0 to 10.0.

6. The capacitor of claim 5 wherein the solution contains a borate in an amount of from 0 to about 5% by weight of the organic solvent.

7. The capacitor of claim 6 wherein the solution contains a base selected from the group consisting of ammonia, dimethylamine, diethylamine and piperidine.

8. The capacitor of claim 7 wherein the polar organic solvent consists of a major amount of ethylene glycol and a minor amount of tetrahydrofurfuryl alcohol and a minor amount of dimethylacetamide.

9. The capacitor of claim 8 wherein the dicarboxylic acid has a molecular weight of about 565 and the carboxylic moieties are separated by 34 —$CH_2$— groups.

10. The capacitor of claim 6 wherein the solution contains from 0 to about 1% by weight of phosphoric acid.

11. The capacitor of claim 10 wherein the polar organic solvent consists of a major amount of ethylene glycol and a minor amount of tetrahydrofurfuryl alcohol.

12. The capacitor of claim 11 wherein the dicarboxylic acid has a molecular weight of about 565 and the carboxylic moieties are separated by 34 —$CH_2$— groups.

13. An electrolytic capacitor particularly adapted for use above 500 volts comprising aluminum anode and cathode members separated by an insulating spacer impregnated with an electrolyte consisting essentially of a solution of about 3-5% by weight of a straight chain saturated aliphatic dicarboxylic acid, the carboxylic moieties of which are separated by 34 $CH_2$ groups and having a molecular weight of about 565, in a mixture, by weight, of about 65-70% ethylene glycol, 7-10% tetrahydrofurfuryl alcohol, 10-16% dimethylacetamide, 4-8% water and 0.6-1.0% dimethylamine.

14. An electrolytic capacitor comprising aluminum anode and cathode members separated by an insulating spacer impregnated with an electrolyte consisting essentially of a solution of about 2-4% by weight of a straight chain saturated aliphatic dicarboxylic acid, the carboxylic moieties of which are separated by 34 $CH_2$ groups and having a molecular weight of about 565, in a mixture, by weight, of about 80-90% ethylene glycol, 8-10% tetrahydrofurfuryl alcohol, 4-10% water and 0.20-0.75% ammonia.

* * * * *